United States Patent [19]

Rizzo

[11] 4,006,550
[45] Feb. 8, 1977

[54] BITE INDICATING FISHING LIGHT

[76] Inventor: John Rizzo, 1546 W. 11th St., Brooklyn, N.Y. 11204

[22] Filed: Dec. 8, 1975

[21] Appl. No.: 638,977

[52] U.S. Cl. .................................................. 43/17
[51] Int. Cl.² ........................................ A01K 97/12
[58] Field of Search ................................ 43/16, 17

[56] References Cited

UNITED STATES PATENTS

| 2,634,538 | 4/1953 | Sader et al. | 43/17 |
| 2,643,371 | 6/1953 | Sleeger | 43/17 |
| 2,680,842 | 6/1954 | Opphile | 43/17 |
| 3,364,610 | 1/1968 | Poole | 43/17 |
| 3,571,536 | 3/1971 | Sparks | 43/17 |

Primary Examiner—Louis G. Mancene
Assistant Examiner—Peter K. Skiff
Attorney, Agent, or Firm—Peter L. Tailer

[57] ABSTRACT

A bite indicating fishing light clips on a fishing rod and has upper and lower hooks projecting from it substantially parallel to the rod through which the fishing line passes so that bite produced tension on the line pulls the hooks into contact lighting the light. A longitudinally sliding switch button flexes one hook toward the other to turn on the light and to set the light's sensitivity to line tension. The lower hook has a base extending through a casing to form a bulb holding clip at the end of the casing remote from the hooks and the upper hook extends into the casing to form a battery contact at the end of the casing disposed toward the hooks. The casing is formed in two longitudinal halves one of which is hinged to the other on a downward and longitudinally bent pin formed from the base of the lower hook.

3 Claims, 10 Drawing Figures

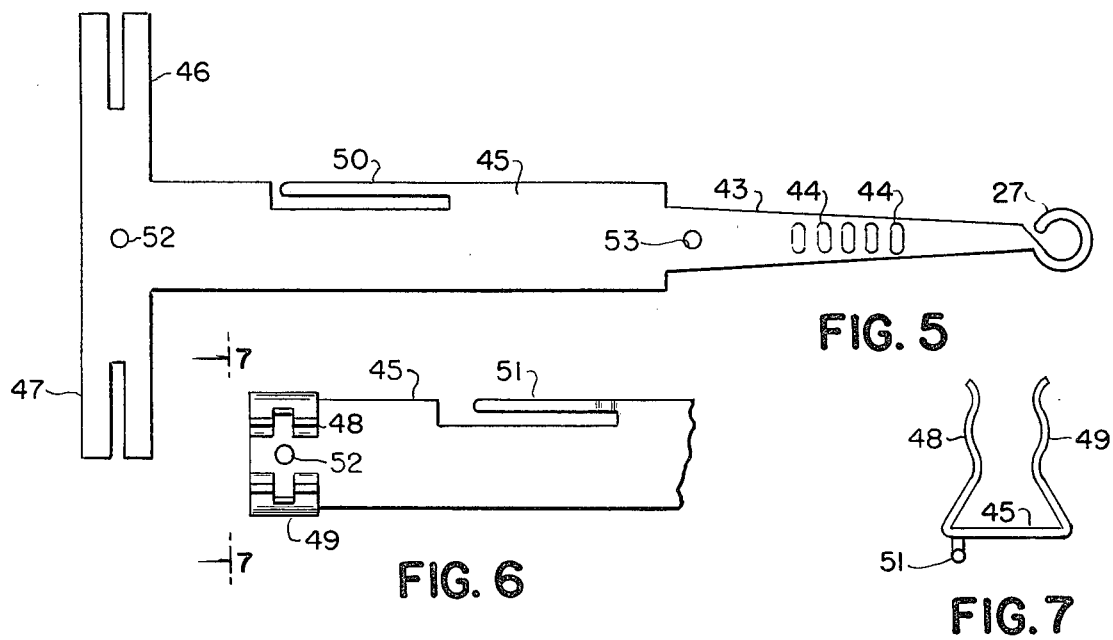
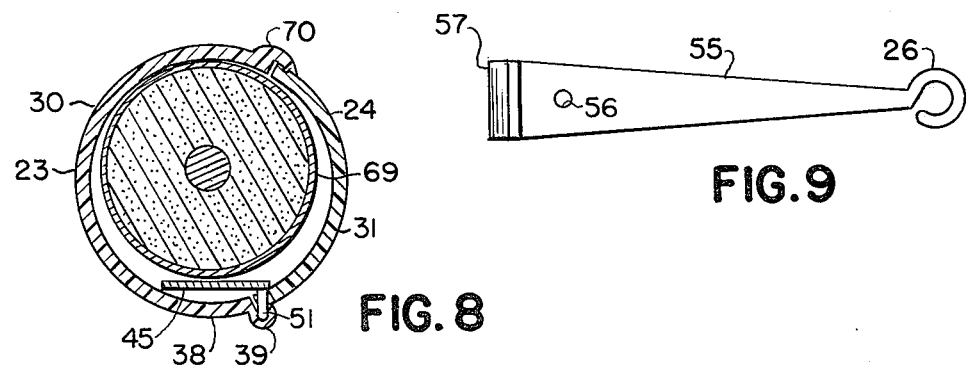
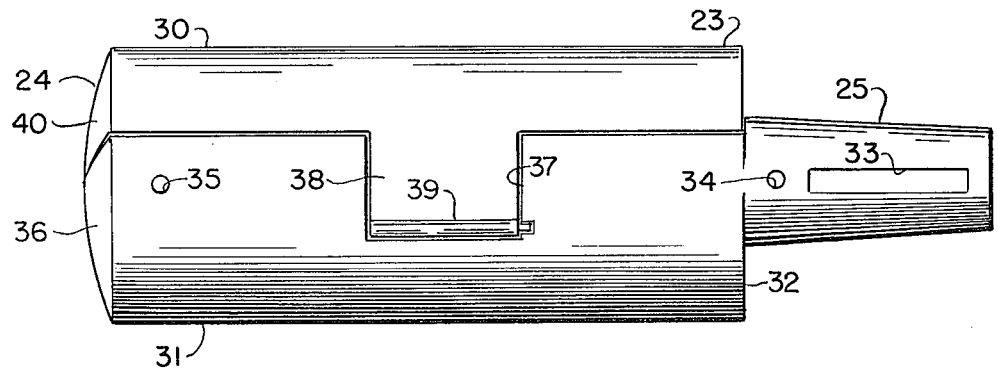

4,006,550

BITE INDICATING FISHING LIGHT

BACKGROUND OF THE INVENTION:

1. Field of the Invention:

This invention relates to lights which light to indicate that a fish is biting or taking bait when fishing with a rod.

2. Description of the Prior Art:

Fishing line floats which incorporate a light that lights to indicate a bite are known.

BRIEF DESCRIPTION OF THE DRAWING:

FIG. 5 is a top view of a blank from which a lower hook is bent;

FIG. 6 is a top view of a front end fragment of a lower hook;

FIG. 7 is a front end view of a lower hook taken on line 7—7 of FIG. 6;

FIG. 8 is a transverse section through the bite indicating light taken on line 8—8 of FIG. 2;

FIG. 9 is a top view of an upper hook; and

FIG. 10 is a bottom view of the casing of my bite indicating light.

Figure 1:
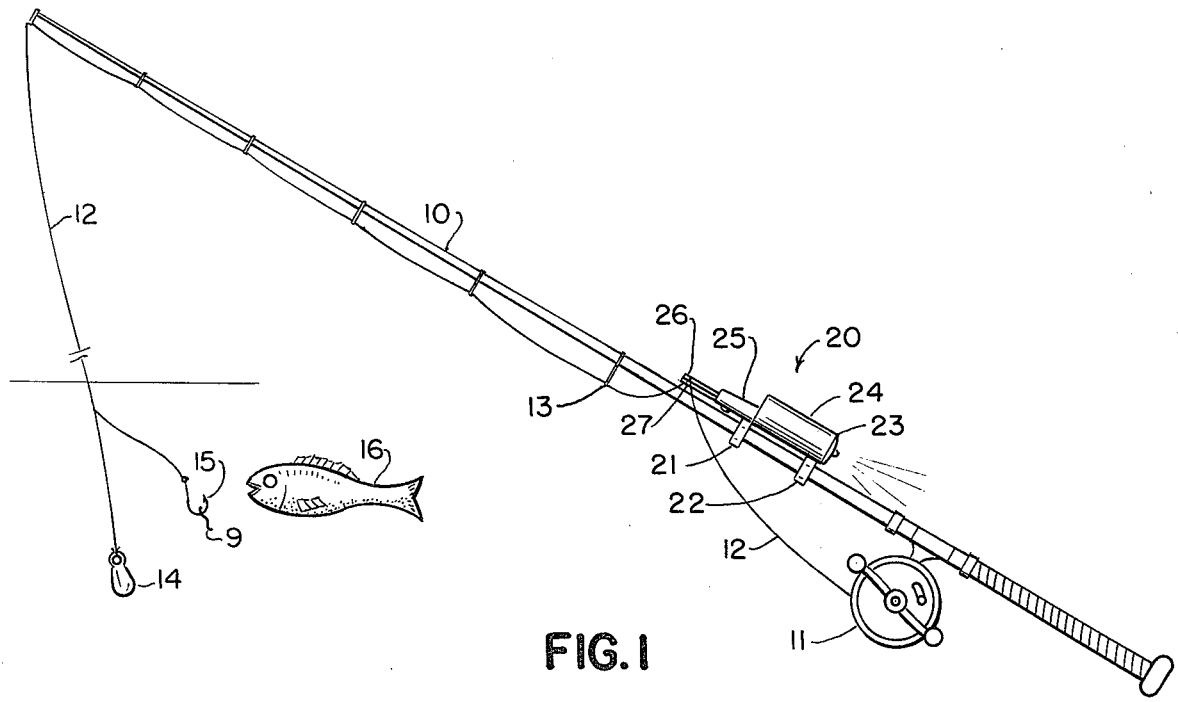
FIG. 1 is a side view of a fishing rod having a bite indicating light according to my invention attached thereto and showing a fish approaching a hook suspended from the fishing rod.

DESCRIPTION OF THE PREFERRED EMBODIMENT:

As shown in FIG. 1, a conventional rod 10 has a reel 11 of any type attached thereto from which a line 12 extends through eyes or guides 13 to a sinker 14 and a hook 15. A fish 16 taking bait 9 from hook 15 will put a momentary tension on line 12. A fisherman must know when he has a bite to jerk his rod 10 and set hook 15 in fish 16.

The light of this invention, generally designated by the reference numeral 20, is removably secured to rod 10 by clips 21 and 22 which extend from casing 23. Casing 23 has a larger cylindrical portion 24 and a smaller extension 25 from which the upper and lower hooks 26 and 27 project.

Figure 2:
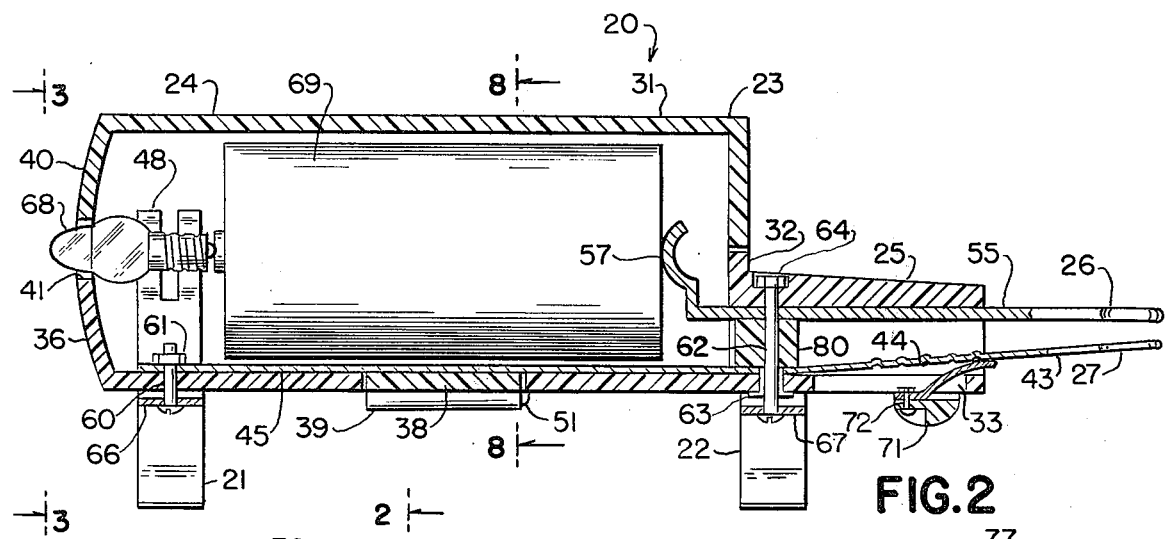
FIG. 2 is a longitudinal, vertical section through the bite indicating light taken on line 2—2 of FIG. 3.
Figure 4:
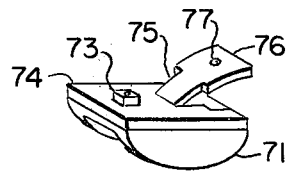
FIG. 4 is a perspective view of a switch button assembly.
Figure 3:
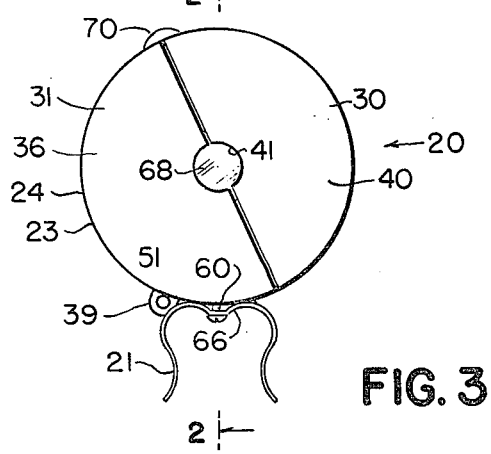
FIG. 3 is a front end view of the bite indicating light taken on line 3—3 of FIG. 2.

Referring now to FIGS. 2–10, the casing 23 of the bite indicating light 20 has its larger cylindrical portion 24 formed in two longitudinal halves 30 and 31. As shown in FIGS. 2 and 10, casing half 31 has extension 25 project from its end wall 32, extension 25 containing a longitudinal slot 33 and a through aperture 34. Adjacent to front wall 36 the bottom of casing half 31 contains aperture 35. A central opening 37 in the bottom portion of casing half 31 receives an extension 38 of casing half 30, extension 38 terminating in a tubular hinge element 39. As may be seen in FIG. 3, front wall 36 of casing half 31 and front wall 40 of casing half 30 contain the central opening 41.

As shown in FIG. 5, lower hook 27 has a tapering shank 43 with upwardly pressed detent indentations 44 formed in it. Shank 43 is integrally formed with and extends from base 45 which has two lateral projections 46 and 47 extend from it remote from hook 27. As may be seen in FIGS. 6 and 7, the lateral projections 46 and 47 are bent upward to form the bulb securing clips 48 and 49. Base 45 is cut away to leave a longitudinal pin 50 which is bent downward and forward to form hinge pin 51. Base 45 and shank 43 contain the apertures 52 and 53.

As shown in FIGS. 2 and 9, upper hook 26 has a shank 55 containing an aperture 56 and terminating in an upwardly bent battery contact 57.

The bite indicating light 20 is assembled as shown in FIG. 2. A first screw 60 passes through the base of clip 21, aperture 35 in casing half 31, and aperture 52 in base 45 to be secured by nut 61. A second screw 62 passes through the base of clip 22, aperture 34 in extension 25, aperture 53 in shank 43, and aperture 56 in shank 55. Screw 62 also passes through an insulating spacer block 80 which is disposed between and positions shanks 55 and 43. An insulating bushing 63 prevents screw 62 from making electrical contact between shanks 55 and 43. A nut 64 secures screw 62. As may be seen in FIGS. 2 and 3, the clips 21 and 22 have inward curving bases 66 and 67 so that tightening the screws 60 and 62 closes the clips 21 and 22 to tightly grip smaller diameter rods 10.

A bulb 68 is placed between the clips 48 and 49 to be disposed behind and partially project through opening 41. A battery 69 is urged into contact with bulb 68 by battery contact 57 of upper hook 26 which is of a flexible, conductive material. Integrally molded hooks 70 hold the closed casing halves 30 and 31 together when casing half 30 is pivoted about hinge pin 51 to the closed position.

A switch button 71 has a screw 72 and a nut 73 which fix contact element 74 to it. Element 74 has an upward bent projection 75 which extends through slot 33 and has an enlarged end 76 with a projection which enters and engages the detent indentations 44 of shank 43. End 76 secures button 71 to slot 33. Nut 73 and projection 75 guide button 71 as it is slid and positioned along slot 33.

As button 71 is slid away from hooks 26 and 27, it flexes shank 43 to cause the hooks 26 and 27 to contact each other and serve as switch contact elements to light bulb 68. Thus the light 20 may be lit to see reel 11 or other tackle in the dark. As button 71 is moved toward hooks 26 and 27, they move apart and break contact. As may be seen in FIG. 1, line 12 is placed within the hooks 26 and 27 while fishing. Tension on line 12 pulls the hooks 26 and 27 into contact to light bulb 68 and indicate a bite. The sensitivity of bite indicating light 20 to tension on line 12 may be set by positioning button 71. For great sensitivity to a slight line tension, button 71 is moved away from hooks 26 and 27 until they are almost touching.

While this invention has been shown and described in the best form known to me, it will nevertheless be understood that modifications may be made without departing from the spirit and scope of my invention. As one example of such modification, button 71 and slot 33 could be on the upper side of extension 25 to flex shank 55 of hook 26. In addition, the light 20 of this invention can be used as a circuit or continuity tester device by applying hooks 26 and 27 to elements of an electrical device and seeing if the bulb 68 lights. Light 20 may also be removed from a rod 10 and used as a flashlight.

I claim:

1. A bite indicating light to be attached to a fishing rod having a reel and a line extending therefrom, said light comprising, in combination, a hollow casing having first and second longitudinal halves forming a cylindrical portion having a front and rear end, said front end containing a central opening, an extension from the rear end of said cylindrical portion having a rear opening integrally formed with said first longitudinal half and a longitudinal slot along the bottom thereof, a central longitudinal tubular hinge element integrally formed with said second longitudinal half, and integrally molded fastening means on said longitudinal halves opposite said hinge element; clip means fixed to said first longitudinal half attaching said casing to a fishing rod; a lower hook projecting from said casing adjacent to said rod, said lower hook having a shank extending through said rear opening in said extension, a base from which said shank extends fixed in said first longitudinal half, a longitudinal pin bent from said base entering said tubular hinge element hinging said first and second longitudinal halves together, and upwardly bent lateral extensions of said base at the end of said base remote from said lower hook; a bulb held between said upwardly bent lateral extensions adjacent to said central operating at the front end of said casing; an upper hook projecting rearwardly from said casing above said lower hook terminating directly above said lower hook, said hooks being of conducting material, said upper hook having a shank extending through said rear opening in said extension and an upwardly bent battery contact within said cylindrical portion of said casing; a battery in said casing contacted by and disposed between said bulb and said battery contact; and a switch button slidably mounted in said longitudinal slot of said extension contacting said lower hook shank urging said lower hook upward into contact with said upper hook on the sliding of said button, said fishing line extending through said hooks so that tension on said fishing line pulls said hooks into contact with each other lighting said bulb.

2. The combination according to claim 1 wherein said switch button has a contact extending through said longitudinal slot to contact said lower hook shank and said shank contacted by said contact of said switch button contains detent indentations.

3. The combination according to claim 2 wherein said clip means securing said casing to a fishing rod comprises clips with inward curving bases, and screws fixing said inward curving bases of said clips to said first half of said casing and fixing said base of said lower hook to said first longitudinal half of said casing, said clips closing on the tightening of said screws.

* * * * *